US010768823B2

(12) United States Patent
Karaje et al.

(10) Patent No.: US 10,768,823 B2
(45) Date of Patent: Sep. 8, 2020

(54) FLOW CONTROL FOR UNALIGNED WRITES IN NETWORK STORAGE DEVICE

(71) Applicant: HEWLETT PACKARD ENTERPRISE DEVELOPMENT LP, Houston, TX (US)

(72) Inventors: Gurunatha Karaje, San Jose, CA (US); Mandar Samant, San Jose, CA (US); Sourabh Yerfule, San Jose, CA (US); Zhaosheng Zhu, Sunnyvale, CA (US); Vanco Buca, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/097,161

(22) Filed: Apr. 12, 2016

(65) Prior Publication Data

US 2017/0293426 A1 Oct. 12, 2017

(51) Int. Cl.
*G06F 3/06* (2006.01)

(52) U.S. Cl.
CPC ............ *G06F 3/061* (2013.01); *G06F 3/0659* (2013.01); *G06F 3/0685* (2013.01); *G06F 3/0688* (2013.01)

(58) Field of Classification Search
CPC ......... G06F 3/061; G06F 3/0619; G06F 3/067
See application file for complete search history.

(56) References Cited

U.S. PATENT DOCUMENTS

| 7,725,568 B2* | 5/2010 | Ng ..................... H04L 41/0896 370/254 |
| 8,051,197 B2* | 11/2011 | Mullendore ............ H04L 47/10 370/235 |
| 8,832,366 B1* | 9/2014 | Huynh ................ G06F 12/0868 711/113 |
| 9,529,707 B2* | 12/2016 | Nakamura ............ G06F 3/0611 |
| 2006/0112155 A1 | 5/2006 | Earl et al. |
| 2011/0267942 A1* | 11/2011 | Aybay ................. H04L 41/0816 370/230 |
| 2016/0239204 A1* | 8/2016 | Harada ................... G06F 3/061 |
| 2017/0052721 A1* | 2/2017 | Yamaji .................... G06F 3/061 |

\* cited by examiner

*Primary Examiner* — Tuan V Thai
*Assistant Examiner* — Alexander J Yoon
(74) *Attorney, Agent, or Firm* — Hewlett Packard Enterprise Patent Department (57) ABSTRACT

Methods, systems, and programs are presented for controlling the flow of data into a device in the presence of writes that are unaligned along boundaries associated with a block size. One method includes operations for identifying admission data rates for volumes, and for tracking a utilization rate of a memory that stores data of incoming writes. The method determines if incoming writes include unaligned data. When the memory utilization rate is above a first threshold, a first flow control is applied that includes a reduction of admission rates of volumes having unaligned writes while maintaining admission rates of volumes without unaligned writes. When the utilization rate is above a second threshold that is greater than the first threshold, a second flow control is applied in addition to the first flow control. The second flow control includes a reduction of a system admission rate for all incoming writes.

20 Claims, 8 Drawing Sheets

FLOW CONTROL FOR UNALIGNED WRITES IN NETWORK STORAGE DEVICE

BACKGROUND

1. Field of the Invention

The present embodiments relates to methods, systems, and programs for controlling the flow of data into a storage device.

2. Description of the Related Art

In file storage systems, it is common to define a block size for each file, and the file system organizes the data of each file based on the block size for the file. Often times, writes to the file are made to addresses that are multiples of the block size. However, sometimes the writes are not aligned along block-size boundaries, these write being referred to as unaligned or misaligned writes, and the file system has to do extra work in order to process these writes.

Misalignment may occur for several reasons. For example, a file may include metadata blocks at the beginning of the file that represent content of the file. Sometimes, the misalignment may occur because of random writes to the file, such as a user editing a text file.

If a file system, such as a network storage device, receives a large amount of unaligned writes, the system performance may deteriorate due to the extra work required to process the unaligned writes. There may be volumes sending aligned writes and other volumes sending unaligned writes, but the volumes that send unaligned writes cause more processing resources and affect the performance of volumes that are behaving "properly" by sending aligned writes.

What is needed is a system that includes fair schedulers able to process incoming data as efficiently as possible, without causing an increase in latency for the processing of the incoming I/Os (Input/Outputs). Further, the mechanism used for flow control must use as few resources as possible to avoid taxing the system with a heavy burden to process the unaligned I/Os.

It is in this context that embodiments arise.

SUMMARY

Methods, devices, systems, and computer programs are presented for controlling the flow of data into a storage device in the presence of writes of data blocks that are not aligned along boundaries associated with the block size. It should be appreciated that the present embodiments can be implemented in numerous ways, such as a method, an apparatus, a system, a device, or a computer program on a computer readable medium. Several embodiments are described below.

One general aspect includes a method for controlling a flow of data into a network storage device, the method including an operation for identifying admission data rates for volumes in the network storage device. The method also includes an operation for tracking a utilization rate of a memory in the network storage device, where the memory is configured for storing data of incoming writes to the volumes. The method determines if incoming writes include unaligned data. An incoming write includes unaligned data when a starting address or an ending address of the incoming write is not a multiple of a block size defined for the respective volume. When the utilization rate of the memory is above a first threshold, a first flow control is applied. The first flow control includes a reduction of admission data rates of volumes having unaligned writes while maintaining admission data rates of volumes not having unaligned writes. When the utilization rate of the memory is above a second threshold that is greater than the first threshold, a second flow control is applied in addition to the first flow control. The second flow control includes a reduction of a system admission data rate for all incoming writes.

Another general aspect includes a network storage device that includes a processor, permanent storage for volumes in the network storage device, a non-volatile random access memory (NVRAM) for storing data of incoming writes to the volumes, and a RAM memory for storing a computer program. The computer program is configured to be executed by the processor to process the incoming writes to the volumes, where the processor identifies admission data rates for the volumes and tracks a utilization rate of the NVRAM. The processor determines if the incoming writes include unaligned data, where an incoming write includes unaligned data when a starting address or an ending address of the incoming write is not a multiple of a block size defined for the respective volume. When the utilization rate of the NVRAM is above a first threshold, the processor applies a first flow control, the first flow control including a reduction of admission data rates of volumes having unaligned writes while maintaining admission data rates of volumes not having unaligned writes. When the utilization rate of the NVRAM is above a second threshold that is greater than the first threshold, the processor applies a second flow control in addition to the first flow control, the second flow control including a reduction of a system admission data rate for all incoming writes.

Another general aspect includes a non-transitory computer-readable storage medium storing a computer program for controlling a flow of data into a network storage device. The computer-readable storage medium includes program instructions for identifying admission data rates for volumes in the network storage device. The storage medium also includes program instructions for tracking a utilization rate of a memory in the network storage device, where the memory is configured for storing data of incoming writes to the volumes. The storage medium also includes program instructions for determining if incoming writes include unaligned data, where an incoming write includes unaligned data when a starting address or an ending address of the incoming write is not a multiple of a block size defined for the respective volume. The storage medium also includes program instructions for applying a first flow control when the utilization rate of the memory is above a first threshold, the first flow control including a reduction of admission data rates of volumes having unaligned writes while maintaining admission data rates of volumes not having unaligned writes. The storage medium also includes program instructions for applying a second flow control in addition to the first flow control when the utilization rate of the memory is above a second threshold that is greater than the first threshold, the second flow control including a reduction of a system admission data rate for all incoming writes.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

DETAILED DESCRIPTION

After measuring the performance of a network storage device with unaligned writes, it has been observed that just five percent of unaligned writes can generate thousands of additional I/Os in a busy system. As the percentage of unaligned writes grows, the system performance quickly deteriorates, becoming a key issue for users of the network storage device.

The present embodiments relates to methods, systems, and programs for controlling the flow of data into a storage device in the presence of writes of data blocks that are not aligned along boundaries associated with the block size.

Flushing unaligned writes from NVRAM to disk is expensive because the flushing requires a sequence of data read-modify-write. Since only a fraction of a given data block needs to be updated, the NVRAM drainer needs to read the entire block from cache or permanent storage into memory, create a new aligned write by combining the original write with the read data, and then write the newly-created aligned write back to storage.

The process of reading data from cache or permanent storage before updating the data back is referred to as an underlay read. This read-modify-write process slows down the effective throughput of the NVRAM drainer. If there is a steady flow of incoming unaligned writes, the NVRAM fills up and the array has to apply backpressure to all initiators, resulting in increased latency. This means that a few volumes with unaligned I/Os can cause high I/O latency for all volumes on the storage device.

It will be apparent, that the present embodiments may be practiced without some or all of these specific details. In other instances, well-known process operations have not been described in detail in order not to unnecessarily obscure the present embodiments.

Figure 1A:
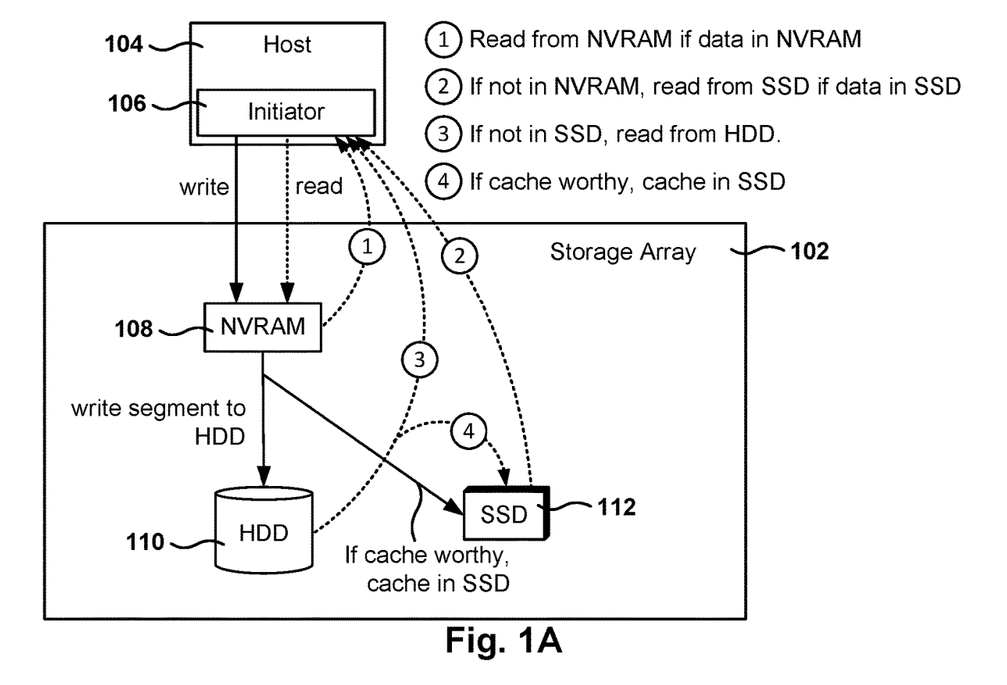
FIG. 1A illustrates the read and write paths within the storage array, according to one embodiment.

FIG. 1A illustrates the read and write paths within the storage array 102, according to one embodiment. The storage array 102 is also referred to herein as a networked storage device or a storage system. In the example architecture of FIG. 1A, a storage array 102 provides storage services to one or more servers 104 (which are referred to herein as hosts) and to one or more clients (not shown). Storage array 102 includes non-volatile RAM (NVRAM) 108, one or more hard disk drives (HDD) 110, and one or more solid state drives (SSD) 112, also referred to herein as flash cache.

NVRAM 108 stores the incoming data as the data arrives to the storage array. After the data is processed (e.g., compressed and organized in segments (e.g., coalesced)), the data is transferred from the NVRAM 108 to HDD 110, or to SSD 112, or to both.

The host 104 includes one or more applications and a computer program named initiator 106 that provides an interface for accessing storage array 102 to the applications running in host 104. When an I/O operation is requested by one of the applications, initiator 106 establishes a connection with storage array 102 in one of the supported formats (e.g., iSCSI, Fibre Channel, or any other protocol).

Regarding the write path, the initiator 106 in the host 104 sends the write request to the storage array 102. As the write data comes in, the write data is written into NVRAM 108, and an acknowledgment is sent back to the initiator 106 (e.g., the host or application making the request). In one embodiment, storage array 102 supports variable block sizes. Data blocks in the NVRAM 108 are grouped together to form a segment. In one embodiment, the segment is compressed and then written to HDD 110.

In addition, if the segment is considered to be cache-worthy (e.g., important enough to be cached or likely to be accessed again) the segment is also written to the SSD 112. In one embodiment, the segment is written to the SSD 112 in parallel while the segment is written to HDD 110.

With regards to the read path, the initiator 106 sends a read request to storage array 102. The requested data may be found in any of the different levels of storage mediums of the storage array 102. First, a check is made to see if the data is found in the NVRAM 108, and if the data is found in the NVRAM 108 then the data is read from the NVRAM 108 and sent back to the initiator 106. In one embodiment, a shadow RAM memory (not shown) (e.g., DRAM) keeps a copy of the data in the NVRAM and the read operations are served from the shadow RAM memory. When data is written to the NVRAM, the data is also written to the shadow RAM so the read operations can be served from the shadow RAM leaving the NVRAM free for processing write operations.

If the data is not found in the NVRAM 108 (or the shadow RAM) then a check is made to determine if the data is in SSD 112, and if so (i.e., a cache hit), the data is read from the SSD 112 and sent to the initiator 106. If the data is not found in the NVRAM 108 or in the SSD 112, then the data is read from the hard drives 110 and sent to initiator 106. In addition, if the data being served from hard disk 110 is cache worthy, then the data is also cached in the SSD 112.

Figure 1B:
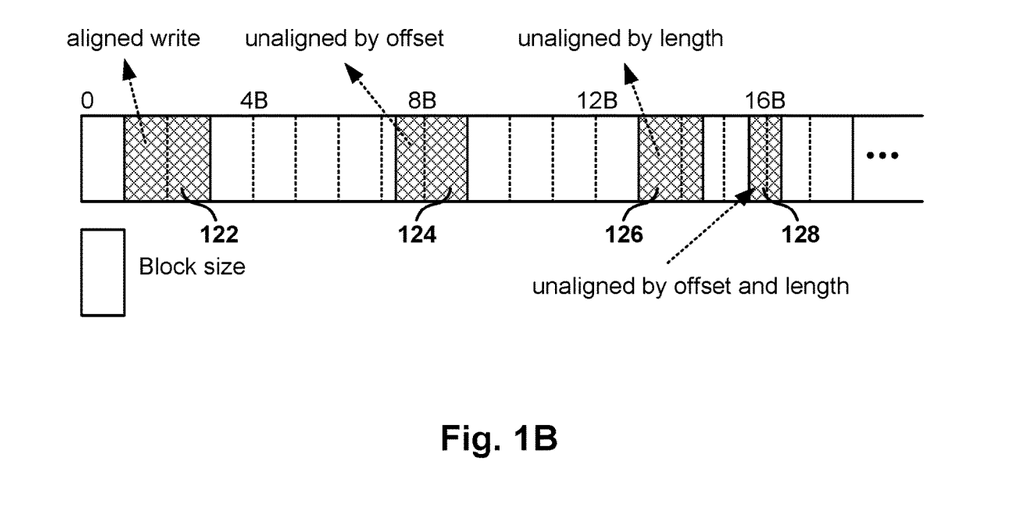
FIG. 1B illustrates how writes are aligned or unaligned, according to one embodiment.

FIG. 1B illustrates how writes are aligned or unaligned, according to one embodiment. FIG. 1B shows the address space of a volume with a block size B (e.g., 4 kB, but other values are also possible), and the address space of the volume is divided into blocks of size B.

An incoming write is said to be aligned when the starting address and the ending address of the incoming write is a multiple of the block size defined for the volume. Write 122 includes two blocks, therefore write 122 has a size of 2B. The starting address of write 122 is at 1B and the ending address is at 3B, thus write 122 has a starting address and an ending address that are multiples of the block size B. Therefore, write 122 is an aligned write.

On the other hand, an incoming write is said to be unaligned when the starting address or the ending address of the incoming write is not a multiple of the block size defined for the volume. When the starting address is not a multiple of the block size, the write is said to be unaligned by offset, and when the ending address is not a multiple of the block size, the write is said to be unaligned by length.

Write 124 is an unaligned write by offset because the starting address is not a multiple of B. Write 126 is unaligned by length because, although the starting address is aligned, the ending address is not a multiple of B. Further, write 128 is unaligned by offset and by length, because neither the starting address nor the ending address is a multiple of B.

The unaligned writes may cause performance degradation in the storage device because, in some embodiments, internal data about the volumes is represented as multiples of the block size. Therefore, when an unaligned write comes in, extra work has to be performed to convert the unaligned write into an aligned write.

In order to convert the unaligned write into an aligned write, the system has to read data before and/or after the address of the unaligned write from cache or permanent storage, modify the write with the read data in order to convert it into another write that is aligned, and then store the new aligned write into permanent storage. This read-modify-write sequence requires additional resources that may negatively affect the performance of the storage device. The sequence may be processor expensive, and/or could be disk expensive if there is a cache miss and the data has to be read from disk. These are expensive disk operations because they are random-access operations.

Figure 2:
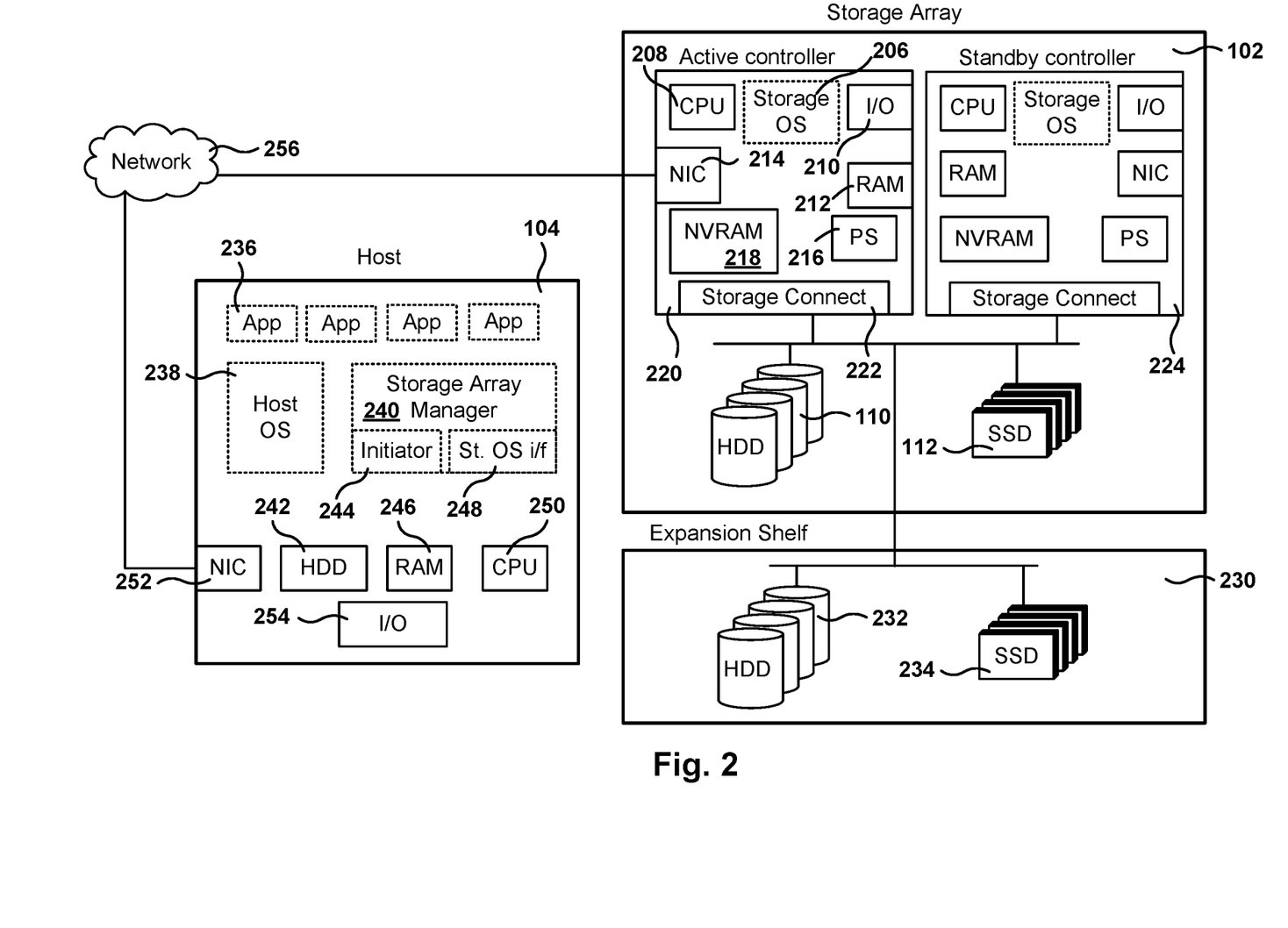
FIG. 2 illustrates an example architecture of a storage array, according to one embodiment.

FIG. 2 illustrates an example architecture of a storage array 102, according to one embodiment. In one embodiment, storage array 102 includes an active controller 220, a standby controller 224, one or more HDDs 110, and one or more SSDs 112. In one embodiment, the controller 220 includes non-volatile RAM (NVRAM) 218, which is for storing the incoming data as it arrives to the storage array. After the data is processed (e.g., compressed and organized in segments (e.g., coalesced)), the data is transferred from the NVRAM 218 to HDD 110, or to SSD 112, or to both.

In addition, the active controller 220 further includes CPU 208, general-purpose RAM 212 (e.g., used by the programs executing in CPU 208), input/output module 210 for communicating with external devices (e.g., USB port, terminal port, connectors, plugs, links, etc.), one or more network interface cards (NICs) 214 for exchanging data packages through network 256, one or more power supplies 216, a temperature sensor (not shown), and a storage connect module 222 for sending and receiving data to and from the HDD 110 and SSD 112. In one embodiment, the NICs 214 may be configured for Ethernet communication or Fibre Channel communication, depending on the hardware card used and the storage fabric. In other embodiments, the storage array 102 may be configured to operate using the iSCSI transport or the Fibre Channel transport.

Active controller 220 is configured to execute one or more computer programs stored in RAM 212. One of the computer programs is the storage operating system (OS) used to perform operating system functions for the active controller device. In some implementations, one or more expansion shelves 230 may be coupled to storage array 102 to increase HDD 232 capacity, or SSD 234 capacity, or both.

Active controller 220 and standby controller 224 have their own NVRAMs, but they share HDDs 110 and SSDs 112. The standby controller 224 receives copies of what gets stored in the NVRAM 218 of the active controller 220 and stores the copies in its own NVRAM. If the active controller 220 fails, standby controller 224 takes over the management of the storage array 102. When servers, also referred to herein as hosts, connect to the storage array 102, read/write requests (e.g., I/O requests) are sent over network 256, and the storage array 102 stores the sent data or sends back the requested data to host 104.

Host 104 is a computing device including a CPU 250, memory (RAM) 246, permanent storage (HDD) 242, a NIC card 252, and an I/O module 254. The host 104 includes one or more applications 236 executing on CPU 250, a host operating system 238, and a computer program storage array manager 240 that provides an interface for accessing storage array 102 to applications 236. Storage array manager 240 includes an initiator 244 and a storage OS interface program 248. When an I/O operation is requested by one of the applications 236, the initiator 244 establishes a connection with storage array 102 in one of the supported formats (e.g., iSCSI, Fibre Channel, or any other protocol). The storage OS interface 248 provides console capabilities for managing the storage array 102 by communicating with the active controller 220 and the storage OS 206 executing therein. It should be understood, however, that specific implementations may utilize different modules, different protocols, different number of controllers, etc., while still being configured to execute or process operations taught and disclosed herein.

Figure 3:
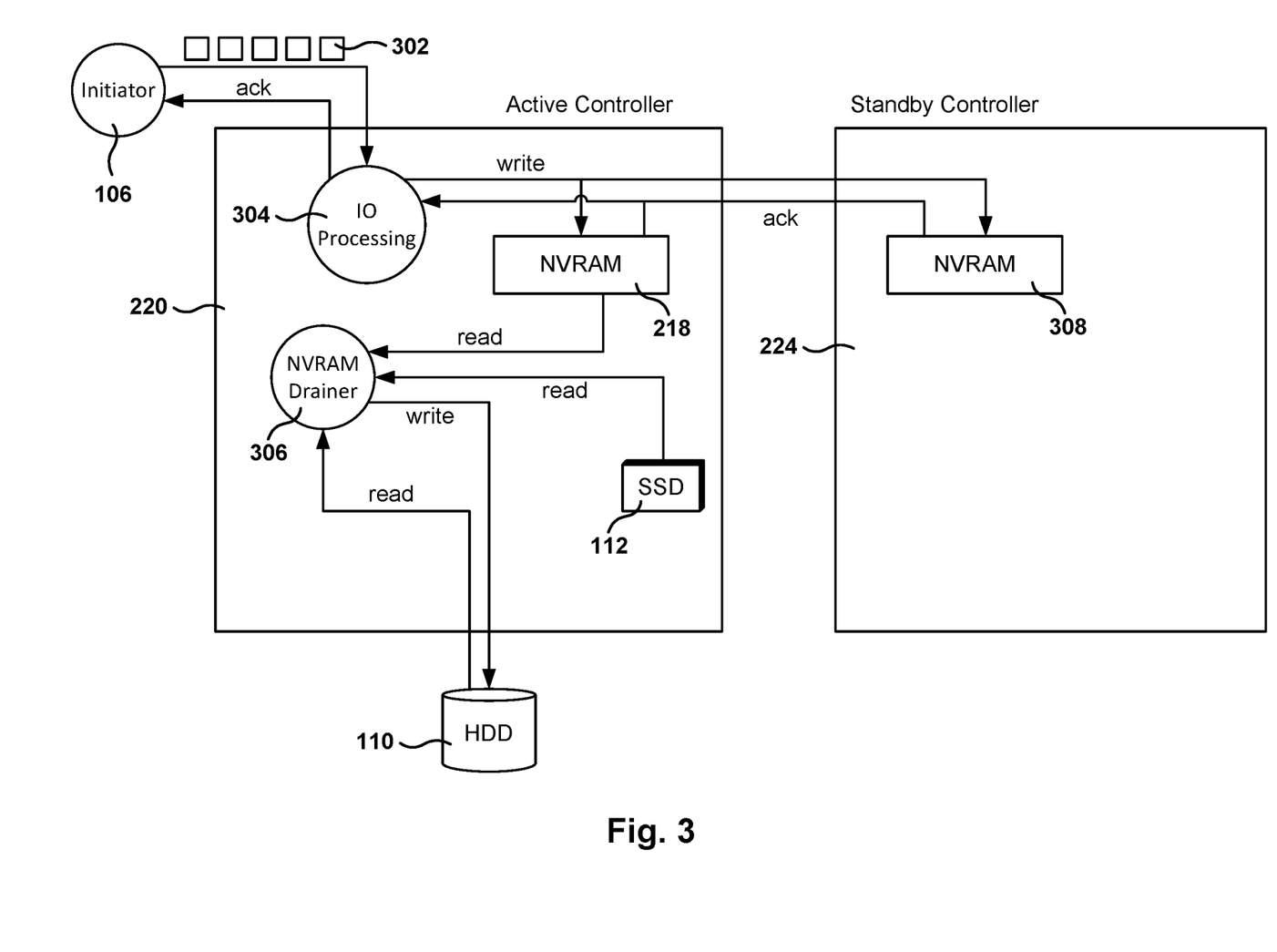
FIG. 3 illustrates the processing of I/O (Input/Output) requests, according to one embodiment.

FIG. 3 illustrates the processing of I/O requests, according to one embodiment. I/Os 302 are created by initiator 106 and come to a socket on the server served by the active controller 220. Write commands may include just a command, or data, or both a command and data. I/O processing module 304 in the active controller looks at the command and decides if more data is needed from the initiator to process the request (e.g., the data associated with a write).

I/O processing module 304 allocates space in NVRAM 218 for writing the incoming data. After the data is written to NVRAM 218, an acknowledgment is sent to I/O processing module 304. In one embodiment, the data is also mirrored (i.e., written) into the NVRAM 308 in standby controller 224. The data is written compressed into NVRAM 218 and 308. After the data is written to NVRAM 308, the standby controller sends a local acknowledgment to I/O processing module 304. Once the data is persistent in NVRAM, I/O processing module 304 sends an acknowledgment back to initiator 106.

A module called NVRAM drainer 306 is executed in the background to flush the contents of the NVRAM 218 to disk 110 in order to free up NVRAM space for new incoming data. NVRAM drainer 306 reads the content from NVRAM 218 and sequences the data into large stripes, then compresses the stripes and writes the stripes to disk 110. When there are unaligned writes, NVRAM drainer 306 reads data from disk 110 or SSD cache 112 to create the aligned write, as described above.

In the presence of unaligned writes, the drain speed to free up space is reduced, and in some cases, it causes a drain speed that is not adequate enough for the system, resulting in increased latency and overall lower performance.

In other implementations, when the NVRAM fills up, the system slows down all the incoming I/Os, but this is an unfair mechanism because the processes that are behaving properly by sending aligned writes are punished for the slowdown caused by the processes that are sending unaligned writes.

In one embodiment, initiators that are sending unaligned writes are slowed down, i.e., the processing of I/Os from these initiators is throttled (i.e., slowed down) to give the system more time to drain the NVRAM, while the initiators that are sending aligned writes are not throttled.

It is noted that some of the embodiments presented herein are described with reference to the use of NVRAM for storing incoming I/Os. However, the same principles may be utilized to track and manage the utilization of other system resources, such as disk space, processor utilization, cache space, network bandwidth, etc. The embodiments illustrated should therefore not be interpreted to be exclusive or limiting, but rather exemplary or illustrative.

Figure 4A:
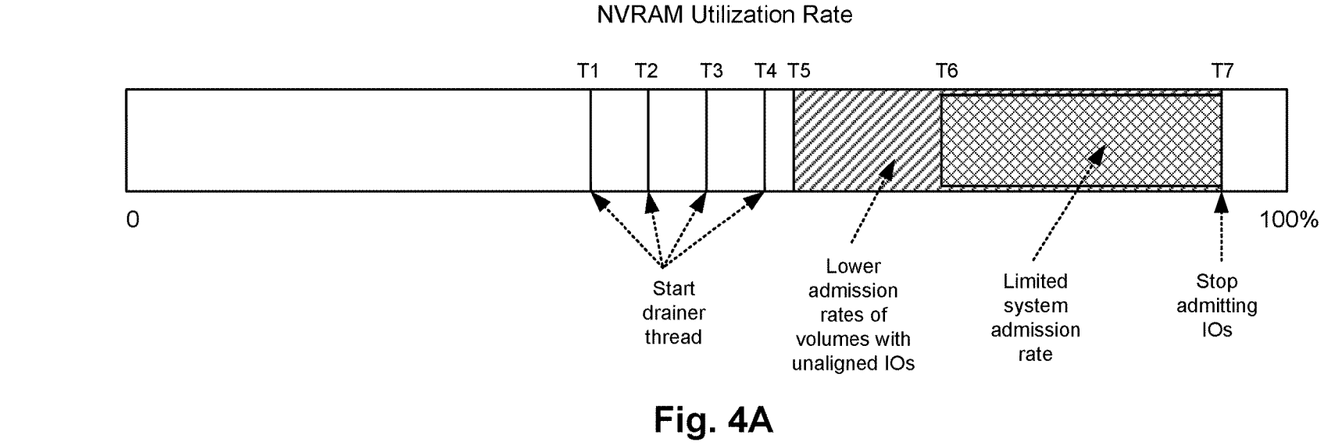
FIG. 4A illustrates thresholds for the NVRAM utilization that trigger operations for flow control, according to one embodiment.

FIG. 4A illustrates thresholds for the NVRAM utilization that trigger operations for flow control, according to one embodiment. Certain resources in the storage device are used to process incoming I/Os, and these resources stay in use (i.e., are not freed yet) even after the I/O is processed and a response is sent back to the initiator. These resources may include NVRAM pages, disk segments, etc. These resources are then free by background tasks, such as the NVRAM drainer that frees NVRAM space.

In one embodiment, the system tracks the NVRAM utilization rate, also referred to herein as utilization rate or NVRAM rate. The NVRAM utilization rate is the amount of NVRAM currently in use divided by the total NVRAM space. In other embodiments, NVRAM space may be reserved for purposes other than processing I/Os, the NVRAM utilization rate is defined as the amount of space in NVRAM in use for processing I/Os divided by the amount of NVRAM space reserved for processing I/Os.

A plurality of thresholds (T1-T7) are defined for the NVRAM utilization rate, and the system takes different actions as the NVRAM utilization rate goes above each of the thresholds. Initially, when the NVRAM utilization rate is below T1 (e.g., 50% but other values are also possible), the system just processes I/Os without any draining activity.

Once the utilization rate goes over threshold T1, the system starts a thread that executes a first instance of the drainer. In systems with multiple cores, additional instances of the drainer are added as the utilization rate keeps growing, until all the cores have an instance of the drainer executing. For example, in a system with 4 cores, as illustrated in FIG. 4A, four instances of the drainer are created as the utilization rate exceeds thresholds T1, T2, T3, and T4, respectively. For example, one instance of the drainer is created every increase of 5% of the utilization rate, and the thresholds would be 50%, 55%, 60%, and 65%, although other values are also possible.

When the utilization rate exceeds threshold T5 (e.g., 75%), the admission rates of volumes with unaligned I/Os are lowered, resulting in a slowdown of initiators sending write requests for volumes with unaligned writes. More details are provided below with reference to FIG. 4B regarding the method for slowing down the volumes with unaligned writes.

When the utilization rate exceeds threshold T6, the storage device starts limiting (i.e., reducing) the overall system admission rate. The overall system admission rate is the admission rate set for the network storage device for all the incoming writes for all the volumes. In addition to the overall system admission rate, each volume may have a volume admission rate, which is the maximum write admission rate for that volume.

Therefore, when the utilization rate is between thresholds T6 and T7, the storage device is reducing the overall system admission rate. The volumes that are receiving unaligned writes have their admission rate reduced further but not the volumes with aligned writes. In one embodiment, as the utilization rate keeps increasing, the overall system admission rate is continually decreased to attempt to flush enough data out of the NVRAM in order to free space for incoming I/Os.

When the utilization rate exceeds a threshold T7, the system stops admitting any I/Os. This is a radical measure, as no I/Os are accepted, which is necessary to allow the drainers to free NVRAM space.

When the utilization rate starts decreasing and going below each of the thresholds, the corresponding reverse actions are taken, such as stop limiting the system admission rate, stop lowering the admission rate of volumes with unaligned writes, and put to sleep the respective drainers.

It is noted that the embodiment illustrated in FIG. 4A is exemplary. Other embodiments may utilize different thresholds, activate more than one core at a time, include additional relief mechanisms, etc. The embodiments illustrated in FIG. 4A should therefore not be interpreted to be exclusive or limiting, but rather exemplary or illustrative.

Figure 4B:
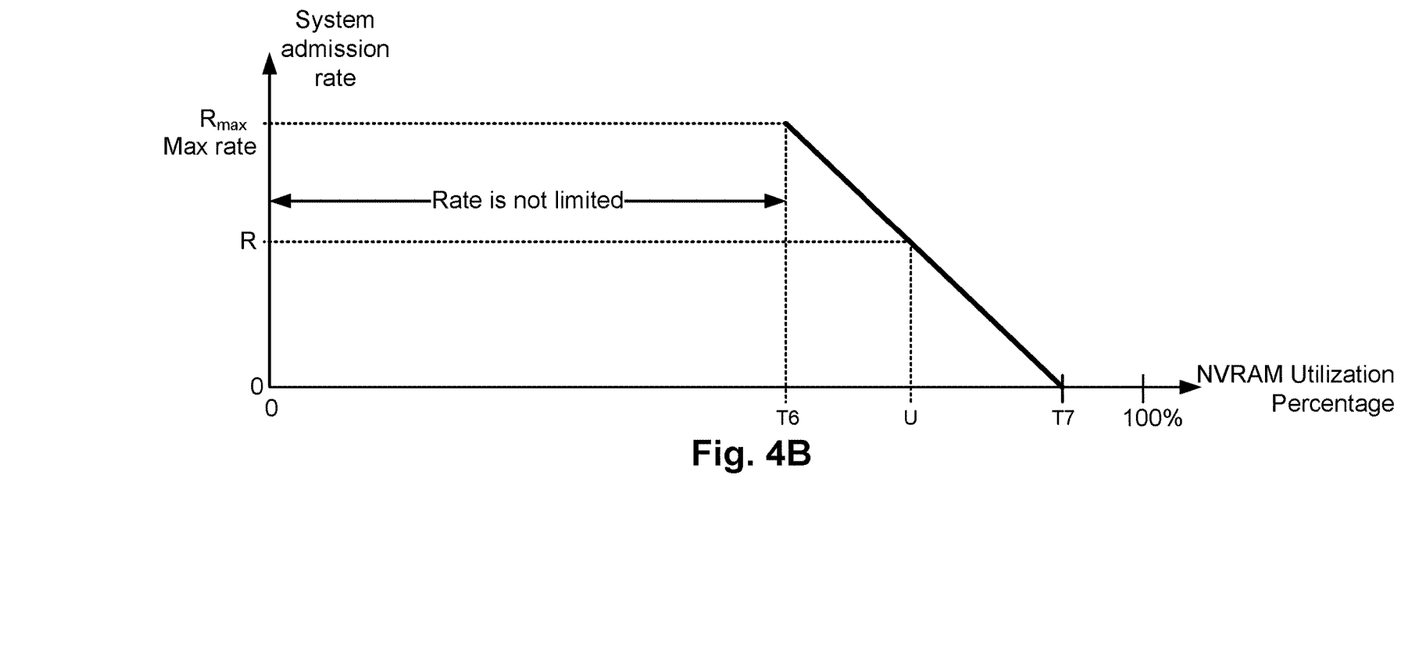
FIG. 4B illustrates the calculation of the system admission rate based on the current NVRAM utilization, according to one embodiment.

FIG. 4B illustrates the calculation of the system admission rate based on the current NVRAM utilization. As described above, between thresholds T6 and T7, the system admission rate is limited. There are different methods for limiting the system rate. In one embodiment, the system rate is lowered at threshold T6 and then the system rate remains constant. In another embodiment, the system admission rate is lowered in stepping increments, going from a maximum system admission rate $R_{max}$ at T6 and then going down to the minimum admission rate at T7. In another embodiment, the decrease is based on a quadratic function or an exponential function, etc.

In the embodiment illustrated in FIG. 4B, the system admission rate is limited linearly, starting at the maximum admission rate $R_{max}$ at T6 and decreasing linearly down to 0 at T7. When the utilization rate is below T6, the system admission rate is not limited, i.e., there is no maximum system admission rate, or the system admission rate is the one configured by the system administrator. In one embodiment, when the utilization rate is greater than T7, the system admission rate is set to zero, which means that no I/Os are admitted into the system.

If U is the current utilization rate and $R_{max}$ is the maximum system admission rate, the system admission rate R is defined according to the following equations:

$$R = \infty; \text{ when } U < T6 (\text{i.e., } R \text{ is not throttled});$$

$$R = R_{max} * \frac{(T7 - U)}{(T7 - T6)}; \text{ when } T6 \leq U \leq T7; \text{ and}$$

$$R = 0; \text{ when } U > T7.$$

Figure 4C:
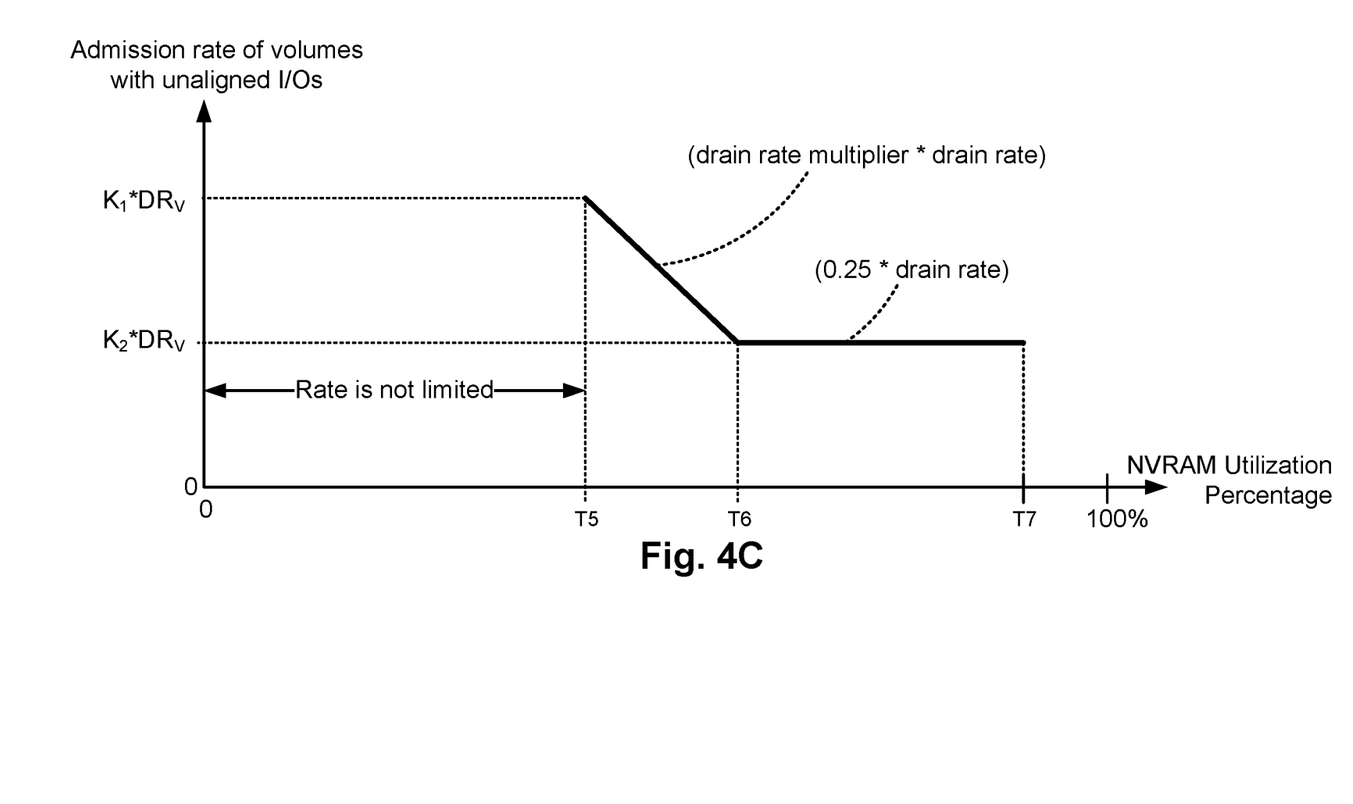
FIG. 4C illustrates the reduction of the admission rate of volumes with unaligned I/Os, according to one embodiment.

FIG. 4C illustrates the reduction of the admission rate of volumes with unaligned I/Os, according to one embodiment. As discussed above with reference to FIG. 4A, the admission rate of volumes with unaligned IOs is reduced when the NVRAM utilization rate goes above T5. In one embodiment, the admission rate is lowered based on the drain rate $DR_v$ of the volume, and the admission rate $R_{uio}$ of volumes with unaligned IOs is calculated as follows:

$R_{uio} = \infty$; when U<T5 (i.e., $R_{uio}$ is not restricted);

$R_{uio} = DR_v * K_{DR}$; when T5≤U≤T6; and $R_{uio} = DR_v * K_2$; when U>T6.

Where $K_{DR}$ is a drain rate multiplier that varies linearly between two predefined values $K_1$ and $K_2$, with $K_2 < K_1$. In one embodiment, $K_1$ is equal to 1 and $K_2$ is equal to 0.25, but other values are also possible.

It is noted, that when the NVRAM utilization rate is over T6, the overall system admission rate is reduced for all volumes. Therefore, the NVRAM utilization rate for volumes with unaligned IOs is further subject to the reduction applied to all volumes.

Figure 5:
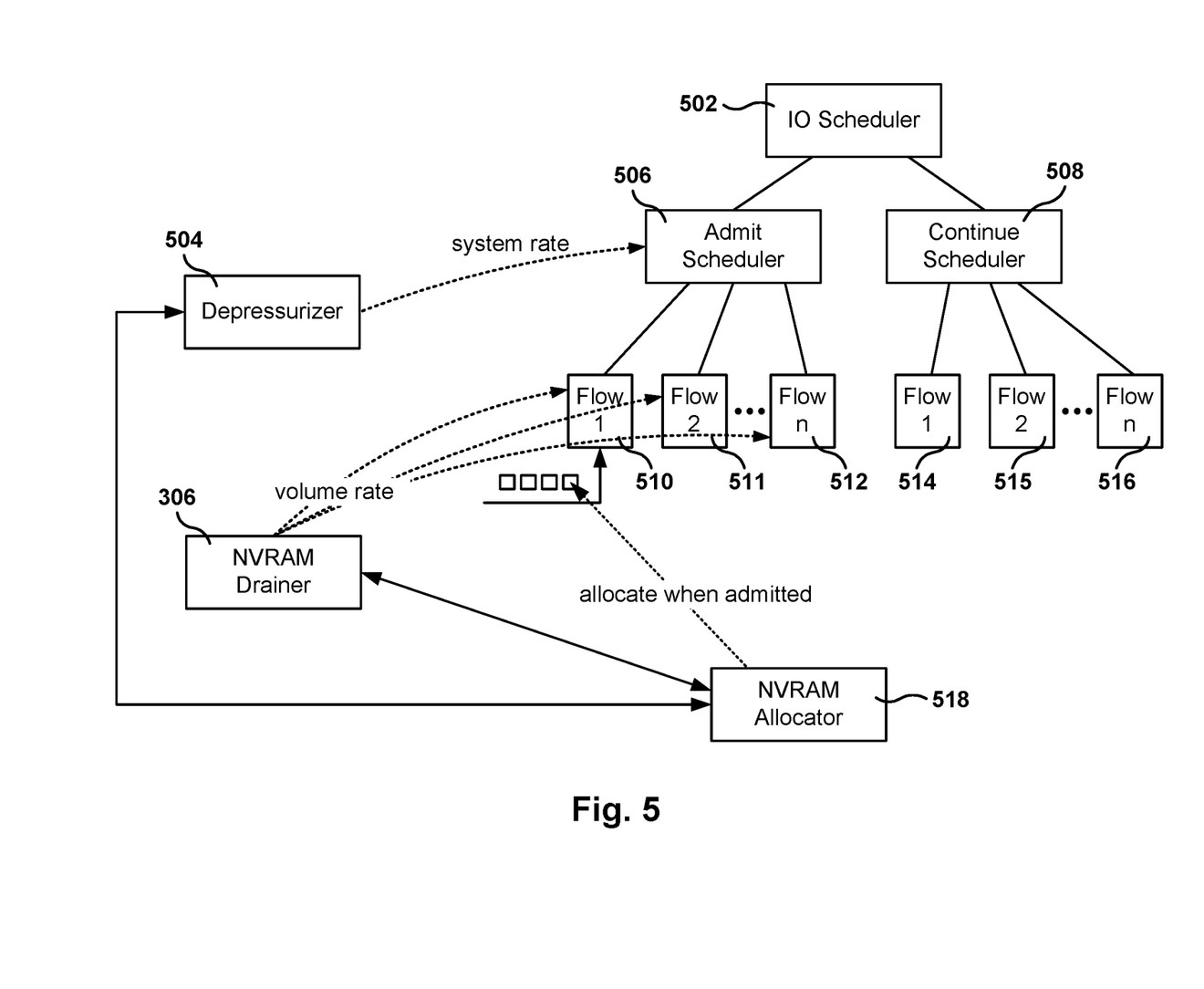
FIG. 5 illustrates the schedulers utilized for processing incoming I/Os, according to one embodiment.

FIG. 5 illustrates the schedulers utilized for processing incoming I/Os, according to one embodiment. In one embodiment, I/O processing takes place in three stages: receive, admit, and continue. In the receive stage, the I/O request is read from a connection or a port. If the request has any associated data (such as data with a write command), the data is also received.

In the admit stage, the I/O request is queued for admission to be processed by the system. The request is admitted based on system resource availability and the volume Quality of Service (QoS) attributes (such as IOPS [Input/Outputs Per Second] limit, fair share of resources, etc.). In the continue stage, the request is processed until the request has to wait for some resource (e.g., being written to NVRAM, read from SSD or HDD, etc.). At this point, the request is suspended until the resource is available and the scheduler assigns processing time to the I/O request again.

When the request is activated again (such as when the NVRAM write completes), the request is queued for further processing in a continuation queue. In one embodiment, the continuation queue is not subject to back pressure, as opposed to the back pressure mechanisms described below for the admit queues. In another embodiment, the continuation queues are also subject to back pressure in similar fashion to the back pressure applied to the admit queues.

The network storage system has different schedulers, such as a CPU scheduler, an I/O scheduler, and a disk scheduler. The I/O scheduler 502 processes the I/O requests and schedules the I/O requests for processor time. I/O scheduling is implemented in a hierarchy of different schedulers. In one embodiment, the I/O scheduler schedules processing time for an admit scheduler 506 and for a continuous scheduler 508. Further, the admit scheduler 506 schedules processing time for the different flows (510-512), where each flow is associated with a volume. Within each flow scheduler (e.g., flow scheduler 510), a queue is kept for queuing the pending admit requests for the corresponding volume. Continue scheduler 508 schedules processing time to the different continue operations associated with the corresponding flow schedulers 514-516.

In one embodiment, admit scheduler 506 executes an algorithm (e.g., hCLOCK, but other algorithms are also possible) for controlling the system admission rate. Admit scheduler 506 controls the system admission rate by guaranteeing that the current admission rate for the overall system does not exceed the desired/configured system admission rate.

Further, each of the flow schedulers 510-512 includes an algorithm for limiting the maximum admission rate for the corresponding volume. Since each flow scheduler is able to control the admission rate for the corresponding volume, it is possible to separately control the admission rates for any of the volumes, by setting the admission rates (e.g., Mbytes/sec) in the corresponding flow schedulers. The incoming I/O commands are submitted for admission and queued at the corresponding flow scheduler (e.g., 510-512).

When the NVRAM utilization rate becomes high, as described above with reference to FIG. 4A, it is possible to slow down the system (i.e., apply back pressure to incoming I/Os) by controlling the system admission rate and by controlling each of the volumes admission rates separately. Therefore, the throttling of I/Os, when necessary, is controlled by the admit scheduler 506 and the corresponding flow schedulers under the admit scheduler, in one embodiment.

A module called depressurizer 504 analyzes the NVRAM utilization rate, information that is obtained from the NVRAM allocator. In one embodiment, each time the utilization rate changes more than a given threshold, the depressurizer 504 gets a signal from the NVRAM allocator. Based on the utilization rate, depressurizer 504 sets the system admission rate in admit scheduler 506.

NVRAM drainer 306 tracks the draining rate for each of the volumes, where the draining rate is the amount of NVRAM freed per unit of time. As NVRAM drainer 306 flushes the data for a volume from NVRAM, NVRAM drainer 306 measures the rate of draining for that particular volume.

Of course, when a volume is busy, the volume will have a higher drain rate than another volume that is less busy. But in general, when a volume has a high percentage of unaligned writes, then the volume will have a low drain rate due to the read-modify-write operations to drain data for that volume. In one embodiment, the drain rate is compared to the I/O requests for the volume, in order to determine if the drain rate is too low for the number of I/O requests for the volume.

One important factor is the percentage of unaligned I/Os, which is more important than the drainage rate, because volumes that are not very busy will have low drainage rates but the volumes are still behaving properly. This means that if a volume has a low drainage rate, but the volume has a low percentage of unaligned I/Os, then the volume will not be throttled.

NVRAM drainer 306 tracks the percentage of unaligned bytes for each volume over time. For example, the NVRAM drainer 306 may determine that, for a given volume, in the last 10 seconds 100 MB where drained, and out of those 100 MB, 60% where unaligned writes.

In one embodiment, an unaligned threshold is identified for the percentage of unaligned bytes. When the system is reducing the admission rates of volumes with unaligned writes (e.g., U is above T5), and the unaligned threshold is exceeded for the volume, this volume will have its admission rate reduced by NVRAM drainer 306 in the corresponding admit flow scheduler.

By reducing the activity of the volume that is sending unaligned writes, the system is able to better utilize resources in order to drain NVRAM faster to free space. In a way, the volume that is misbehaving is isolated or slowed down so the bad behavior doesn't impact the performance of volumes that are "behaving" properly by sending aligned writes. This means that the latency for the volumes with unaligned writes will increase faster that the latency for volumes with aligned writes. It is noted that volumes with aligned writes will be processed faster and flushed out of memory quicker, therefore, improving the overall system performance.

Applying back pressure at the admit stage may cause a buildup of I/Os waiting to be admitted. This may cause the system to run out of resources to receive I/O requests from connections or ports. In one embodiment, when this happens, back pressure is applied to initiators by dropping their I/O requests and sending SCSI_BUSY status messages.

It is noted that the embodiments illustrated in FIG. 5 are exemplary. Other embodiments may utilize different schedulers, flow control measures, or combine the functionality of different modules into one, etc. The embodiments illustrated in FIG. 5 should therefore not be interpreted to be exclusive or limiting, but rather exemplary or illustrative.

Figure 6:
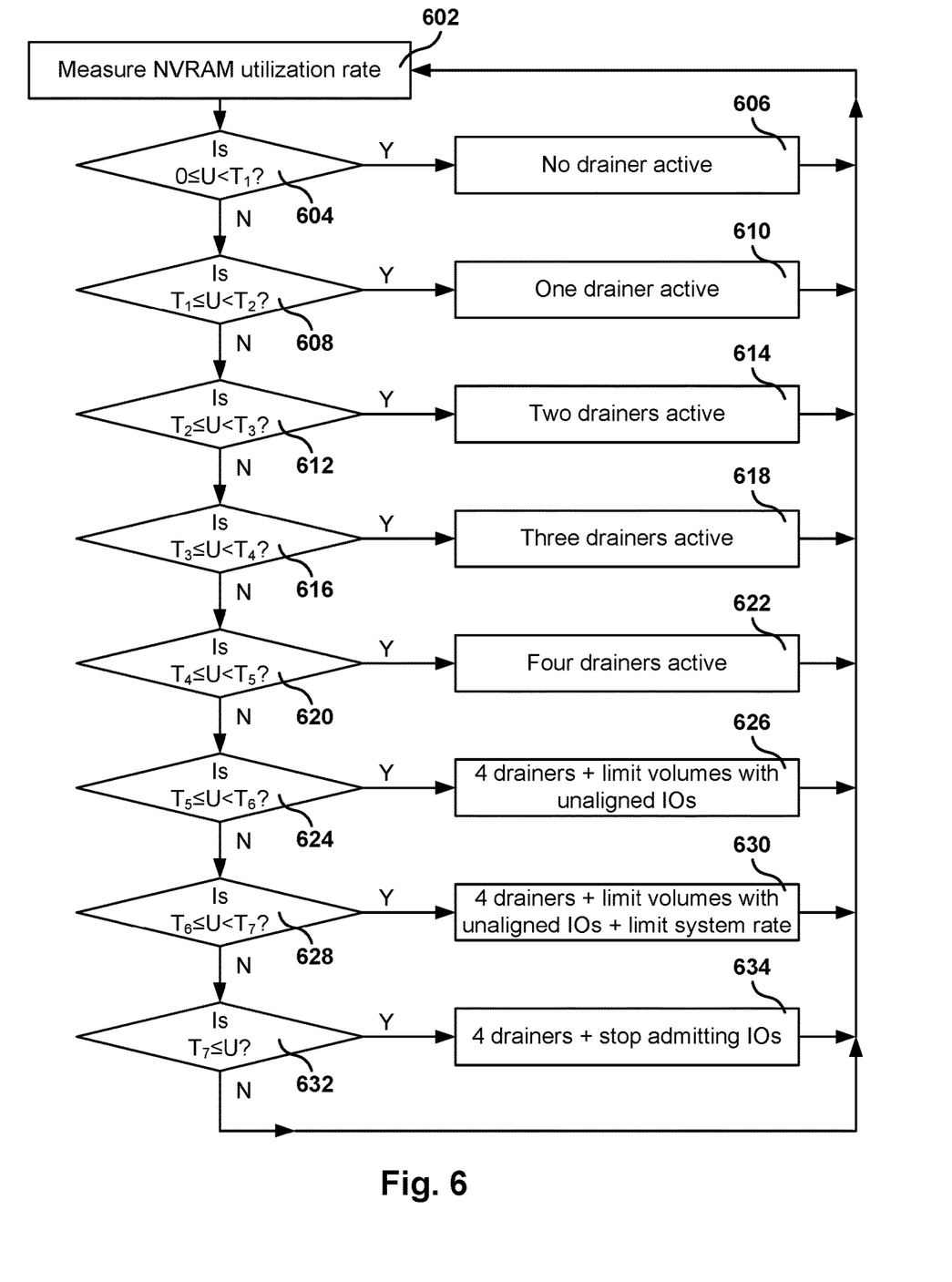
FIG. 6 is a flowchart for applying flow control mechanisms based on the NVRAM utilization rate, according to one embodiment.

FIG. 6 is a flowchart for applying flow control mechanisms based on the NVRAM utilization rate, according to one embodiment. While the various operations in this flowchart are presented and described sequentially, one of ordinary skill will appreciate that some or all of the operations may be executed in a different order, be combined or omitted, or be executed in parallel.

In operation 602, the NVRAM utilization rate U is measured. From operation 602, the method flows to operation 604 where a check is made to determine if the utilization rate U is less than or equal to a first threshold T1. If U is less than or equal to T1, the method flows to operation 606, and if U is greater than T1 the method flows to operation 608. In operation 606, the system has no drainer active, where the drainer is responsible for freeing NVRAM by flushing some of the NVRAM data to permanent storage. From operation 606, the method flows back to operation 602.

In operation 608, a check is made to determine if the utilization rate U is between T1 and a second threshold T2. If T1<U<T2 then the method flows to operation 610 where one drainer is active for flushing data from NVRAM. Otherwise, the method flows to operation 612. From operation 610, the method flows back to operation 602.

In operation 612, a check is made to determine if the utilization rate U is between T2 and a third threshold T3. If T2<U<T3 then the method flows to operation 614 where two drainers are active for flushing data from NVRAM. Otherwise, the method flows to operation 616. From operation 614, the method flows back to operation 602.

In operation 616, a check is made to determine if the utilization rate U is between T3 and a fourth threshold T4. If T3<U<T4 then the method flows to operation 618 where three drainers are active for flushing data from NVRAM. Otherwise, the method flows to operation 620. From operation 618, the method flows back to operation 602.

In operation 620, a check is made to determine if the utilization rate U is between T4 and a fifth threshold T5. If T4<U<T5 then the method flows to operation 622 where four drainers are active for flushing data from NVRAM. Otherwise, the method flows to operation 624. From operation 622, the method flows back to operation 602.

In operation 624, a check is made to determine if the utilization rate U is between T5 and a sixth threshold T6. If T5<U<T6 then the method flows to operation 626 where four drainers are active for flushing data from NVRAM and the admission rate of volumes with unaligned IOs is limited (i.e., reduced). Otherwise, the method flows to operation 628. From operation 626, the method flows back to operation 602.

In operation 628, a check is made to determine if the utilization rate U is between T6 and a seventh threshold T7. If T6<U<T7 then the method flows to operation 630 where four drainers are active for flushing data from NVRAM, the admission rate of volumes with unaligned IPOs is limited, and the system admission rate is also limited. Otherwise, the method flows to operation 632. From operation 630, the method flows back to operation 602.

In operation 632, a check is made to determine if the utilization rate U is greater than or equal T7. If T7≤U then the method flows to operation 634 where four drainers are active for flushing data from NVRAM and the system stops admitting I/Os. Otherwise, the method flows back to operation 602. From operation 634, the method flows back to operation 602.

Figure 7:
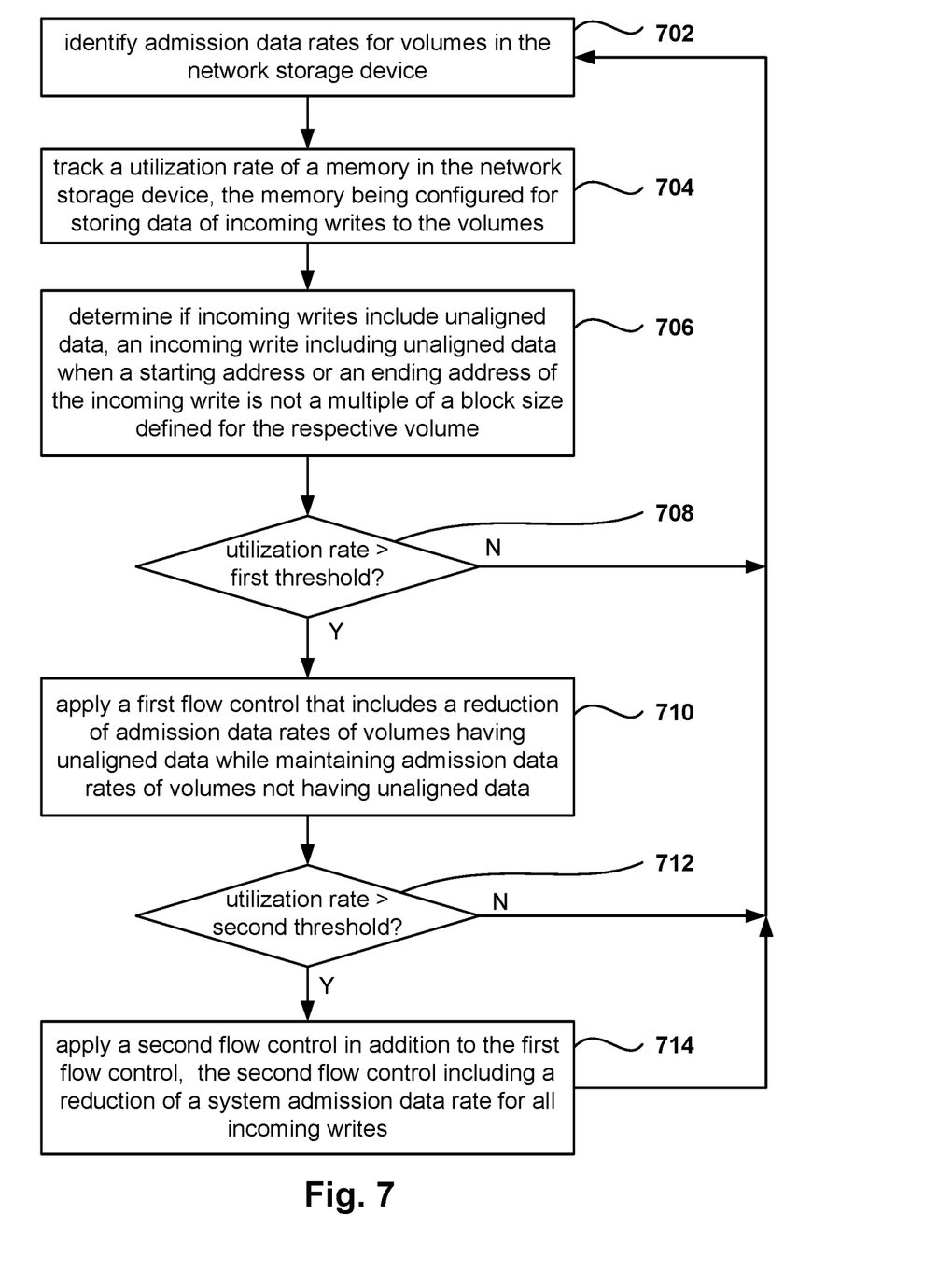
FIG. 7 is a flowchart for controlling the flow of data into a storage device in the presence of writes of data blocks that are not aligned along boundaries associated with the block size, according to one embodiment.

FIG. 7 is a flowchart for controlling the flow of data into a storage device in the presence of writes of data blocks that are not aligned along boundaries associated with the block size, according to one embodiment. While the various operations in this flowchart are presented and described sequentially, one of ordinary skill will appreciate that some or all of the operations may be executed in a different order, be combined or omitted, or be executed in parallel.

Operation 702 is for identifying admission data rates for volumes in the network storage device. From operation 702, the method flows to operation 704 where the utilization rate of a memory in the network storage device is tracked. The memory is configured for storing data of incoming writes to the volumes of the storage device.

From operation 704, the method flows to operation 706 where a determination is made if incoming writes include unaligned data. An incoming write includes unaligned data when a starting address or an ending address of the incoming write is not a multiple of a block size defined for the respective volume.

From operation 706, the method flows to operation 708 where a check is made to determine if the utilization rate is greater than the first threshold. If the utilization rate is greater than the first threshold, the method flows to operation 710, and if the utilization rate is not greater than the first threshold the method flows to operation 702.

In operation 710, a first flow control is applied. The first flow control includes a reduction of admission data rates of volumes having unaligned writes while maintaining admission data rates of volumes not having unaligned writes. From operation 710, the method flows to operation 712 where a check is made to determine if the utilization rate is greater than a second threshold. If the utilization rate is greater than the second threshold, the method flows to operation 714, and if the utilization rate is not greater than the second threshold the method flows to operation 702.

In operation 714, a second flow control is applied in addition to the first flow control. The second flow control includes a reduction of a system admission data rate for all incoming writes. From operation 714, the method flows back to operation 702.

Embodiments of the present disclosure may be practiced with various computer system configurations including hand-held devices, microprocessor systems, microprocessor-based or programmable consumer electronics, minicomputers, mainframe computers and the like. The embodiments can also be practiced in distributed computing environments where tasks are performed by remote processing devices that are linked through a network.

With the above embodiments in mind, it should be understood that the embodiments can employ various computer-implemented operations involving data stored in computer systems. These operations are those requiring physical manipulation of physical quantities. Any of the operations described herein are useful machine operations. The embodiments also relate to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

One or more embodiments can also be fabricated as computer readable code on a non-transitory computer readable storage medium. The non-transitory computer readable storage medium is any non-transitory data storage device that can store data, which can be thereafter be read by a computer system. Examples of the non-transitory computer readable storage medium include hard drives, network attached storage (NAS), read-only memory, random-access memory, CD-ROMs, CD-Rs, CD-RWs, magnetic tapes and other optical and non-optical data storage devices. The non-transitory computer readable storage medium can include computer readable storage medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for controlling a flow of data into a storage device, the method comprising:
   identifying, by a processor, admission data rates for volumes of the storage device;
   determining, by the processor, a respective utilization rate of an incoming write memory in the storage device at each of a plurality of times, wherein the incoming write memory is to store data of incoming writes to the volumes, wherein determining the utilization rate comprises dividing an amount of currently-used space of the incoming write memory by a total size of the incoming write memory;
   comparing the utilization rate of the incoming write memory, at a first time of the plurality of times, to a first utilization threshold;
   in response to a determination that the utilization rate of the incoming write memory at the first time is above the first utilization threshold, applying, by the processor, a first flow control at the storage device, the first flow control to reduce, to a non-zero amount, admission data rates for incoming writes from each volume of the storage device having an amount of unaligned writes exceeding an unaligned threshold while maintaining admission data rates for incoming writes from each volume of the storage device having an amount of unaligned writes that does not exceed the unaligned threshold, wherein an unaligned write has at least one of a starting address or an ending address that is not a multiple of a block size defined for the respective volume;
   comparing the utilization rate of the incoming write memory, at a second time of the plurality of times, to a second threshold greater than the first threshold;
   in response to a determination that the utilization rate of the incoming write memory at the second time is above the second threshold, applying, by the processor, a second flow control at the storage device, the second flow control to reduce a system admission data rate for incoming writes from each volume of the storage device, including each volume having an amount of unaligned writes exceeding the unaligned threshold and each volume having an amount of unaligned writes not exceeding the unaligned threshold.

2. The method as recited in claim 1, further comprising:
based on the utilization rate of the incoming write memory at a third time of the plurality of times being above a third utilization threshold that is greater than the second utilization threshold, applying a third flow control to suspend admission of the incoming writes from each volume of the storage device.

3. The method as recited in claim 1, further comprising:
applying the second flow control to reduce the system admission data rate by setting the admission data rate in a first scheduler that schedules processing of the incoming writes by scheduling a processing time to second schedulers, each second scheduler being associated with a respective volume.

4. The method as recited in claim 1, further comprising freeing part of the incoming write memory by writing content of the incoming write memory to a permanent storage, wherein a write having aligned data is transferred from the incoming write memory to permanent storage.

5. The method as recited in claim 4, further comprising:
detecting that a first incoming write has unaligned data;
reading, from the permanent storage or a cache, data of the volume associated with the first incoming write;
creating a second incoming write that has aligned data by adding some of the read data to the first incoming write; and
transferring the second incoming write to the permanent storage.

6. The method as recited in claim 1,
wherein the first utilization threshold is in a range of 60 percent to 79 percent utilization rate, and wherein the second utilization threshold is in a range of 80 percent to 90 percent utilization rate.

7. The method of claim 1, comprising:
for each of the volumes, determining whether the unaligned threshold is exceeded for the volume.

8. The method of claim 7, comprising:
for each of the volumes, tracking the percentage of unaligned bytes among the incoming writes for the volume over time; and
for each of the volumes, determining whether the unaligned threshold is exceeded for the volume based on the tracked percentage of unaligned bytes for the volume.

9. A network storage device comprising:
a processor;
a plurality of storage devices;
a non-volatile random access memory (NVRAM) for storing data of incoming writes to the volumes; and
a non-transitory computer-readable storage medium comprising instructions executable by the processor to:
determine a respective utilization rate of the NVRAM at each of a plurality of times, wherein determination of the utilization rate of the NVRAM comprises dividing an amount of currently-used space of the NVRAM by a total size of the NVRAM;

in response to a determination that the utilization rate of the NVRAM at a first time of the plurality of times is above a first utilization threshold, apply a first flow control at the network storage device, the first flow control including a reduction, to a non-zero amount, of admission data rates for incoming writes from each volume of the network storage device having an amount of unaligned writes exceeding an unaligned threshold while maintaining admission data rates for incoming writes from each volume of the network storage device having an amount of unaligned writes that does not exceed the unaligned threshold, wherein an unaligned write has at least one of a starting address or an ending address that is not a multiple of a block size defined for the respective volume; and in response to a determination that the utilization rate of the NVRAM at a second time of the plurality of times is above a second utilization threshold that is greater than the first threshold, apply a second flow control at the network storage device, the second flow control including a reduction of a system admission data rate for all incoming writes from all of the volumes of the network storage device.

10. The network storage device as recited in claim 9, wherein the instructions are executable by the processor to, in response to a determination that the utilization rate of the NVRAM at a third time of the plurality of times is above a third utilization threshold that is greater than the second utilization threshold, apply a third flow control which includes suspending admission of incoming writes from each volume of the storage device.

11. The network storage device as recited in claim 9, wherein the instructions are executable by the processor to reduce the system admission rate by setting the admission data rate in a first scheduler that schedules processing of the incoming writes by scheduling a processing time to second schedulers, each second scheduler being associated with a respective volume.

12. The network storage device as recited in claim 11, wherein the instructions are executable by the processor to reduce the admission data rate of a given one of the volumes reducing the admission data rate in the second scheduler associated with the given volume, wherein each of the second schedulers enforces the admission data rate for a respective volume.

13. The network storage device as recited in claim 9, wherein the admission data rate defines an amount of data admitted per second.

14. The network storage device as recited in claim 9, wherein the instructions are executable by the processor to free part of the NVRAM by writing content of the NVRAM to the plurality of storage devices, wherein an aligned write is transferred from the NVRAM to the plurality of storage devices, wherein the instructions are executable by the processor to free the drainer frees an unaligned write from the NVRAM by:

detecting that a first incoming write is unaligned;

reading, from the plurality of storage devices or a cache, data of the volume associated with the first incoming write;

creating a second incoming write that is aligned by adding some of the read data to the first incoming write; and transferring the second incoming write to the plurality of storage devices.

15. A network storage device of claim 9, the instructions executable by the processor to:

for each of the volumes, determine whether the unaligned threshold is exceeded for the volume.

16. A network storage device of claim 15, the instructions executable by the processor to:

for each of the volumes, track the percentage of unaligned bytes among the incoming writes for the volume over time; and for each of the volumes, determine whether the unaligned threshold is exceeded for the volume based on the tracked percentage of unaligned bytes for the volume.

17. A non-transitory computer-readable storage medium storing machine readable instructions for controlling a flow of data into a storage device, the instructions, executable by a processor to:

identify admission data rates for volumes in the storage device;

determine a respective utilization rate of an incoming write memory in the storage device at each of a plurality of times, wherein the incoming write memory is to store data of incoming writes to the volumes, wherein the utilization rate is determined by dividing an amount of currently-used space of the incoming write memory by a total size of the incoming write memory;

in response to a determination that the utilization rate of the incoming write memory at a first time is above a first utilization threshold, apply a first flow control at the storage device, the first flow control to reduce, to a non-zero amount, admission data rates for incoming writes from each volume of the storage device having an amount of unaligned writes exceeding an unaligned threshold while maintaining admission data rates for incoming writes from each volume of the storage device having an amount of unaligned writes that does not exceed the unaligned threshold, wherein an unaligned write has at least one of a starting address or an ending address that is not a multiple of a block size defined for the respective volume; and in response to a determination that the utilization rate of the incoming write memory at a second time is above a second utilization threshold that is greater than the first utilization threshold, apply a second flow control at the storage device, the second flow control to reduce the admission data rates for incoming writes from each volume of the storage device, including each volume having an amount of unaligned writes exceeding the unaligned threshold and each volume having an amount of unaligned writes not exceeding the unaligned threshold.

18. The non-transitory computer-readable storage medium as recited in claim 17, wherein the instructions are executable by the processor to:

apply a third flow control based on the utilization rate of the incoming write memory at a third time being above a third utilization threshold that is greater than the second utilization threshold, wherein the third flow control is to suspend admission of the incoming writes for each of the volumes of the storage device.

19. The non-transitory computer-readable storage medium of claim 17, the instructions executable by the processor to:

for each of the volumes, determine whether the unaligned threshold is exceeded for the volume.

20. The non-transitory computer-readable storage medium of claim 19, the instructions executable by the processor to:
- for each of the volumes, track the percentage of unaligned bytes among the incoming writes for the volume over time; and
- for each of the volumes, determine whether the unaligned threshold is exceeded for the volume based on the tracked percentage of unaligned bytes for the volume.

* * * * *